Feb. 26, 1935. F. WINKLER 1,992,594
PROCESS OF SINTERING AND FUSING QUARTZ
Filed Nov. 28, 1930
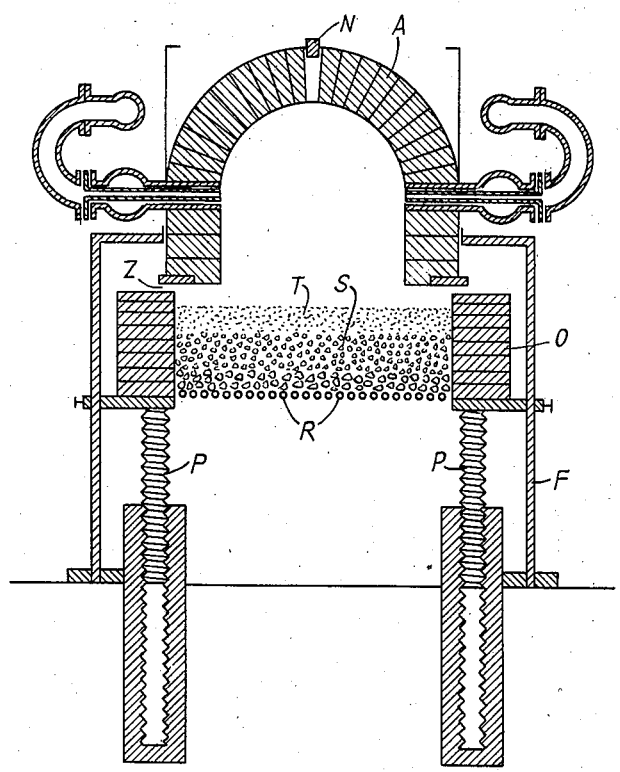
Inventor
Fritz Winkler.
By his Attorneys
Hauff Warland Patented Feb. 26, 1935

1,992,594

UNITED STATES PATENT OFFICE 1,992,594

PROCESS OF SINTERING AND FUSING QUARTZ

Fritz Winkler, Ludwigshafen-on-the-Rhine, Germany, assignor to I. G. Farbenindustrie Aktiengesellschaft, Frankfort-on-the-Main, Germany Application November 28, 1930, Serial No. 498,588
In Germany November 29, 1929

5 Claims. (Cl. 49—78.1)

The present invention relates to a process of sintering and fusing quartz.

I have found that pure quartz bodies are readily obtained by consolidating fine-grained quartz spread out in a layer of uniform thickness on a substratum of coarser grained quartz by heating it at least to sintering temperature by means of a current of hot gas directed downwards onto it. The quartz to be consolidated is employed in the form of a powder or of small grains of a diameter up to about 2 millimeters. This fine-grained material is spread out in a uniform layer on a substratum of quartz, preferably consisting of several layers of quartz gradually increasing in thickness from about 4 millimeters up to several centimeters. When the uppermost layer of fine-grained quartz has been consolidated either by sintering or fusing a fresh layer of fine-grained quartz may be applied thereto which again is consolidated with the first layer, and thus quartz bodies of considerable thickness may readily be produced. The fine-grained quartz to be employed is preferably rolled and mixed in rotary drums provided with quartz plates before it is employed so that the edges and corners of the grains become ground off and the grains assume a more spherical shape.

The process is preferably carried out in a furnace having a removable bottom on which the layers of quartz are spread out. When it is intended to produce porous quartz bodies in the manner described, it is preferable to carry out the sintering process in a furnace in which the bottom is a cooled grate on which the layers of quartz gradually increasing in thickness are placed and through which the current of hot gas is passed.

Furnaces suitable for carrying out the process will now be described reference being had to the accompanying drawing which shows in vertical cross-section a furnace having a removable grate which may be employed with advantage for the operation according to the present invention. The invention is, however, not restricted to the particular furnace shown in the said drawing.

Into the upper part of the furnace constructed of refractory brick material A, as for example bricks of magnesium oxide, heating combustion gas and oxygen or air enriched with oxygen are blown in all round through nozzles. The furnace rests on supports F to which is attached a frame-work O containing the quartz charge and which may be raised or lowered by means of screws P. The framework O comprises at its lower part a grate consisting of water-cooled iron tubes R. Various layers of quartz S are arranged on these iron tubes, first pieces of quartz having a diameter of about 5 centimeters, secondly pieces of a diameter of 3 centimeters, then of a diameter of 1½ centimeters and then those of a diameter of ½ centimeter. After covering these with grains about 2 millimeters in diameter, a layer T about 6 centimeters thick of quartz grains only 1 millimeter in diameter is arranged on the top. In order to ensure a uniform passage of the hot gases through the quartz layer and thus to obtain a uniform sintering of the fine quartz grains while maintaining the porosity it is important that the building up of the quartz layer shall be carried out carefully and especially that the grains having a diameter of 1 and 2 millimeters shall be well sieved. The layer of grains 1 millimeter in diameter consists preferably of quartz which has already been fused. The remaining pieces of quartz may consist of quartzite. The entire quartz layer is held in position by zirconium bricks built all round. The furnace, which has an internal diameter of 50 centimeters, is first heated to 1200° C. with 50 cubic meters of water-gas and 50 cubic meters of air after the framework O together with the layer of quartz has been moved up until there is a gap Z of 4 centimeters between it and the cupola. The burners are arranged diametrically opposite each other in order to prevent the jets of flame from striking the walls of the furnace. The gap Z is then reduced to about 2 centimeters. The heating gases then pass partly through the layer of quartz grains and leave the furnace through the grate R. After about an hour, 8 cubic meters of oxygen are added per 50 cubic meters of water-gas and the gap Z is reduced to 0.5 centimeter. The temperature then rises to 1550° C. as can be observed with the aid of a pyrometer through the opening N and the pieces of quartz glass commence to join together on the surface. A straight quartz glass rod kept in the furnace at this temperature bends down after about 4 minutes. The fusion process may be observed quite well through the gap Z. After the temperature of about 1550° C. has been maintained for about half an hour the bottom of the furnace is lowered 50 centimeters. The resulting porous plate 50 centimeters in diameter and 2 centimeters in thickness is carefully lifted off still red hot with the aid of 2 quartz plates inserted thereunder. Grains of quartz glass 1 millimeter in diameter are then placed on top of the remaining quartz substratum until the layer is at its original height and the bottom of the furnace is again raised to within 0.5 centimeter of the upper part. After 2 hours another plate may be withdrawn. Each time after applying the layers of quartz grains 1 millimeter in diameter the gap Z should not at first be made too narrow. The quartz layer should first be heated to a temperature of about 1400° C. until the upper quartz grains are lightly joined together since otherwise the grains 1 millimeter in diameter may be blown away by the gases escaping through the gap Z.

If it is desired to prepare a very fine-grained body of quartz, such as is necessary for filtering purposes, a layer of grains 1 millimeter in thickness already prepared is used as the substratum. A thin layer of quartz glass grains 0.5 millimeter in diameter is strewed on the white-hot layer of grains 1 millimeter in diameter and this is sintered in the manner described. A layer of still finer quartz grains is then applied to this and sintered in the same manner.

Optical glasses for lenses, mirrors and the like of quartz may be prepared in the manner hereinbefore described. Quartz plates of large dimensions may also be prepared, because furnaces of the said kind may be constructed having diameters of 3 meters and more. Even in these large furnaces the uniform heating of the middle of the bottom of the furnace offers no difficulty because the radiation of heat takes place from the cover of the furnace to the bottom. By allowing a movable bottom of a furnace to rotate and by imparting a corresponding shape to the pulverulent material to be worked up, a rotation paraboloid may be produced which can be converted into the exact shape of a telescope mirror by grinding with but little expenditure of energy.

The process may also be employed for the preparation of large porous quartz articles having diameters of 1 meter and more. Furthermore, a layer of pieces of quartz glass may be shaken on to the already sintered article and porous plates 50 centimeters and more in thickness may thus be prepared.

The porous plates prepared according to the present invention may be employed as substrata for optical mirrors, for reflectors for astronomical purposes and the like.

What I claim is:—

1. A process of producing quartz bodies which comprises spreading out a layer of loose coarse-grained quartz to form a substratum, spreading out a layer of uniform thickness of finer grained quartz on said substratum and directing a current of hot gas downwardly onto the layer of fine-grained quartz to heat the latter at least to sintering temperature, but without sintering the substratum, to effect a consolidation of the layer of fine-grained quartz without consolidating the coarse-grained quartz.

2. A process of producing quartz bodies which comprises spreading out a layer of loose coarse-grained quartz to form a substratum, spreading out a layer of uniform thickness of fine-grained quartz on said substratum and directing a current of hot gas downwardly onto and through the layer of fine-grained quartz to heat the latter at least to sintering temperature, but without sintering the substratum, to effect a consolidation of the layer of fine-grained quartz without consolidating the coarse-grained quartz.

3. A process of producing quartz bodies which comprises spreading out a layer of loose coarse-grained quartz to form a substratum, spreading out a layer of uniform thickness of finer grained quartz on said substratum and directing a current of hot gas downwardly onto the layer of fine-grained quartz to heat the latter at about 1800° C., but without sintering the substratum, to effect a consolidation of the layer of fine-grained quartz without consolidating the coarse-grained quartz.

4. A process of producing quartz bodies which comprises forming a quartz substratum by spreading out several layers of grains of quartz progressively decreasing in diameter from several centimeters in the lower-most layer to about 4 millimeters in the upper-most layer, spreading out a layer of uniform thickness of fine-grained quartz of a diameter up to about 2 millimeters on the said substratum and directing a current of hot gas downwardly onto the layer of fine-grained quartz to heat the latter at least to sintering temperature, but without sintering the substratum, the current of hot gas being regulated so as to effect a slow heating up of the said layer of fine-grained quartz to the sintering temperature to effect a consolidation of the layer of fine-grained quartz without consolidating the substratum.

5. A process of producing quartz bodies which comprises forming a quartz substratum by spreading out several layers of grains of quartz progressively decreasing in diameter from several centimeters in the lower-most layer to about 4 millimeters in the upper-most layer, spreading out a layer of uniform thickness of fine-grained quartz of a diameter up to about 2 millimeters on the said substratum and directing a current of hot gas downwardly onto the layer of fine-grained quartz to heat the latter to about 1800° C., but without sintering the substratum, the current of hot gas being regulated so as to effect a slow heating up of the said layer of fine-grained quartz to said temperature to effect a consolidation of the layer of fine-grained quartz without consolidating the substratum.

FRITZ WINKLER.